EPITAXIAL GALLIUM ARSENIDE

Filed Dec. 23, 1966

INVENTORS
Oran W. Wilson
George R. Cronin
BY Jack A Kanz
ATTORNEY

EPITAXIAL GaAs* ON SEMI-INSULATING GaAs SUBSTRATES

| SAMPLE NO. | 300°K $\rho$ (OHM-CM) | 300°K $\mu$ $CM^2/VOLT^{-1}SEC^{-1}$ | 300°K $n$ CARRIERS $CM^3$ | 77°K $\rho$ (OHM-CM) | 77°K $\mu$ $CM^2/VOLT^{-1}SEC^{-1}$ | 77°K $n$ CARRIERS $CM^3$ |
|---|---|---|---|---|---|---|
| 1 | 0.98 | 8,500 | $7.4 \times 10^{14}$ | 0.17 | 60,000 | $5.9 \times 10^{14}$ |
| 2 | 2.50 | 8,200 | $3.1 \times 10^{14}$ | 0.31 | 65,000 | $3.1 \times 10^{14}$ |
| 3 | 2.60 | 8,100 | $3.0 \times 10^{14}$ | 0.32 | 66,000 | $3.0 \times 10^{14}$ |
| 4 | 11.00 | 7,700 | $7.4 \times 10^{13}$ | 0.92 | 75,000 | $9.1 \times 10^{13}$ |
| 5 | 17.00 | 7,100 | $5.2 \times 10^{13}$ | 1.32 | 77,000 | $6.3 \times 10^{13}$ |
| 6 | 58.00 | 3,600 | $3.0 \times 10^{13}$ | 2.50 | 64,000 | $3.9 \times 10^{13}$ |

* ALL SAMPLES n-TYPE

Fig. 2

United States Patent Office 3,471,324

Patented Oct. 7, 1969

3,471,324

EPITAXIAL GALLIUM ARSENIDE

Oran W. Wilson, Richardson, and George R. Cronin, Dallas, Tex., assignors to Texas Instruments Incorporated, Dallas, Tex., a corporation of Delaware Filed Dec. 23, 1966, Ser. No. 604,346
Int. Cl. H01b *19/04;* C01g *15/00;* C01b *27/02*
U.S. Cl. 117—201 5 Claims

ABSTRACT OF THE DISCLOSURE

Gallium arsenide is deposited onto a gallium arsenide substrate by reacting hydrogen chloride gas produced by reducing arsenic trichloride with hydrogen with elemental gallium at elevated temperatures and combining this gaseous stream with a second stream of arsenic trichloride with hydrogen near a heated gallium arsenide substrate.

Figure 1:
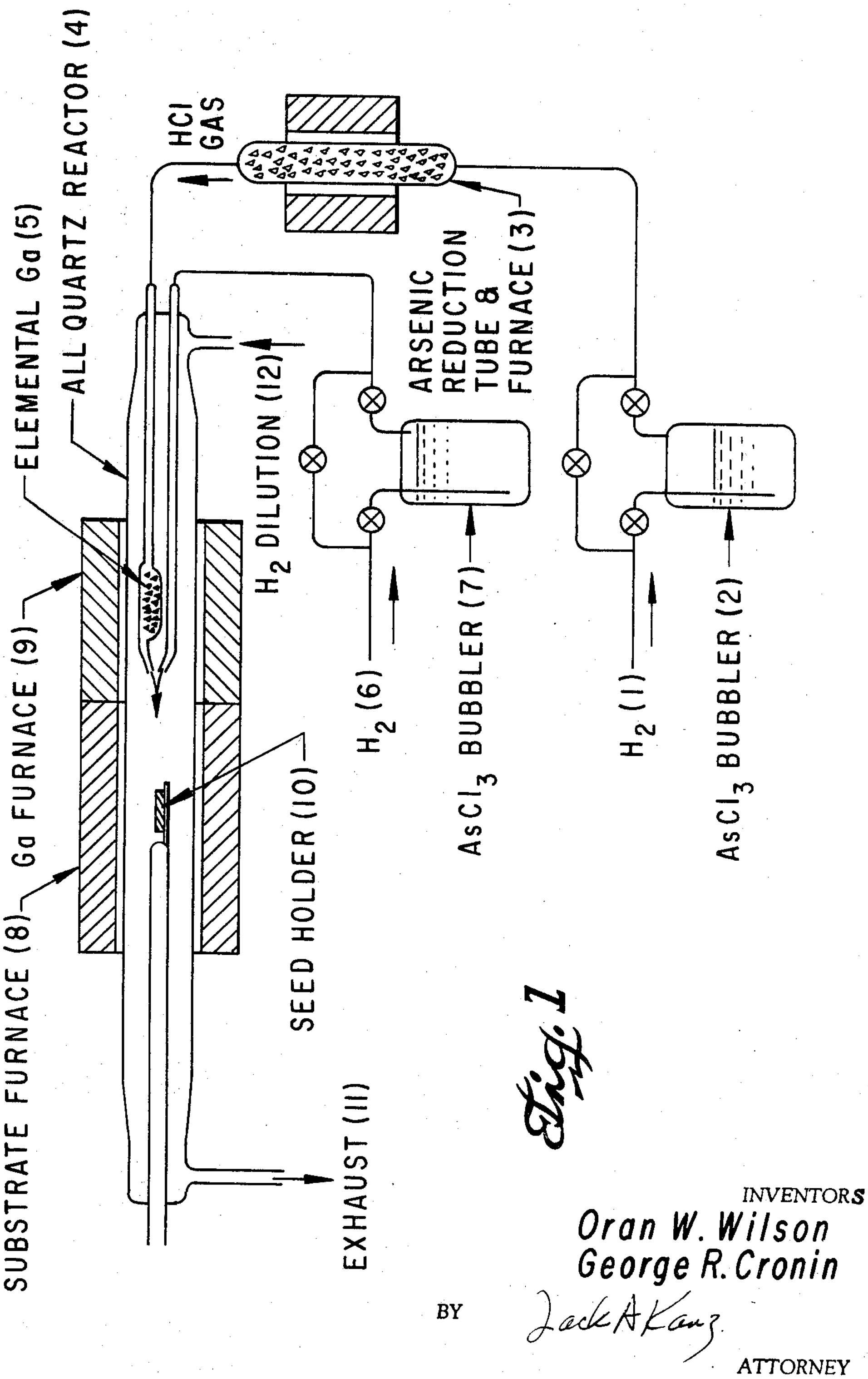

This invention relates to gallium arsenide (GaAs), and more particularly to a method of epitaxially growing high purity gallium arsenide upon a gallium arsenide seed or substrate by the simultaneous reduction of chlorides of gallium and arsenic.

A need exists for epitaxial gallium arsenide of high purity for use as starting material in electronic device fabrication. Obviously, specific levels of uncompensated carrier concentration can be more accurately obtained when the material to be doped has a low level of impurities.

Present methods for epitaxially depositing gallium arsenide, all of which have shortcomings which reduce the purity of the deposit, utilize several different sources of gallium and arsenic. In one method, the compound gallium arsenide is transported by carrier gas over the substrate. This method is limited because it is difficult to obtain high purity bulk gallium arsenide as a starting material. In another method, elemental gallium is transported by HCl gas and the elemental arsenic is transported by $H_2$. This method is also limited because the source of arsenic is rather impure, which is likewise the case when arsine is used as a source of arsenic. And in yet another method, elemental gallium is arsenided by arsenic trichloride $AsCl_3$ and then conveyed over the substrate. The drawback to this method is the lack of control over the reactant vapor composition. All these methods generally use substrates cut on the major planes, a fact which limits these methods to a given segregation coefficient. Thus the methods enumerated lack flexibility in controlling impurity concentrations.

It is therefore an object of the invention to provide a method of producing epitaxial deposits of gallium arsenide of extremely high purity. It is another object of the invention to provide a method of producing deposits of selected impurity concentrations by adjusting the segregation coefficient of the substrate.

Other objects and advantages of the invention will become more readily understood from the following detailed description taken in conjunction with the appended claims and attached drawings in which:

FIGURE 1 depicts suitable apparatus for practicing the method of the present invention, and FIGURE 2 is a table indicating the resistivity, mobility and excess carrier concentration of six consecutive samples of gallium arsenide epitaxially grown by the method of the invention.

In accordance with the method of the present invention, pure HCl gas formed by bubbling highly pure hydrogen gas ($H_2$) through arsenic trichloride ($AsCl_3$) and then through a reduction furnace is passed over elemental gallium contained in a gallium furnace. Arsenic is supplied by bubbling $H_2$ through $AsCl_3$. The two gas streams are then brought together in a mixing chamber near the substrate. This arrangement allows good control over the vapor composition over a wide range of concentrations. The elemental gallium, $AsCl_3$, HCl and $H_2$ used in this system can all be highly purified and easily transported. This method requires no pre-arseniding or conditioning of any kind.

The amount of unreacted HCl which contacts the substrate plays an important role as a cleanser of the vapor-solid interface. At a given temperature, the amount of HCl is a function of the flow rates of the two gas streams and the surface area of the gallium. Too great an amount produces etching of the substrate; a deficiency permits impurities to be deposited.

Another part of the method of the present invention is to accurately orient the substrate or seeds off the major planes thereof to change the segregation coefficient of the impurities just enough to control the properties of the deposits.

By adjusting the parameters discussed above, perfect epitaxial deposits of gallium arsenide can be deposited on a substrate at temperatures as low as 650° C., which is about 100° lower than by conventional methods. This is advantageous since the lower the operating temperature, the fewer impurities are absorbed from the reactor.

Referring now to the drawings, FIGURE 1 depicts a system comprising two gas streams: the HCl gas stream which passes through the gallium reservoir 5 located in the gallium furnace 9, and the $AsCl_3$ gas stream which enters the gallium furnace at the mixing portion of the reactor at a point before the substrate or seed holder 10 located in the substrate furnace 8, at which point the two gas streams come together and mix. The HCl stream is contained in the hydrogen line 1 which passes through an $AsCl_3$ bubbler 2 leading to an arsenic reduction tube and furnace 3. High purity HCl gas produced in this tube enters the gallium furnace and passes through the elemental gallium reservoir 5 in reactor 4. The $AsCl_3$ gas stream is contained in the hydrogen line 6 which passes through an $AsCl_3$ bubbler 7 and continues into the reactor 4. Spent gases exit through exhaust 11. A hydrogen dilution stream 12 enters in front of the mixing chamber.

The apparatus should be constructed of highly pure, non-reactive material, suitable examples being quartz for the reactor 4 and Teflon for connecting lines and fittings. The heat for the reactor operation and for the arsenic reduction tube may be supplied by any suitable means, such as external resistance heaters.

To transport gallium into the system, highly pure hydrogen, a suitable example being palladium purified hydrogen, is bubbled through distilled arsenic trichloride ($AsCl_3$) bubbler 2. The $AsCl_3$-$H_2$ stream passes through the arsenic reduction tube in furnace 3 where the stream is reduced to highly pure HCl gas and elemental arsenic, the latter depositing on the walls of the exhaust end of the tube 3 according to the following equation:

$$3H_2+2AsCl_3\rightarrow 2As+6HCl$$

This method of preparing the HCl gas is utilized because $H_2$ and $AsCl_3$ can be obtained in a purer form than HCl itself. Moreover, any unreduced $AsCl_3$ which enters the reactor does not constitute an impurity but is actually one of the reactants. Thus, highly pure HCl gas is provided by a process which virtually precludes the introduction of impurities.

The highly pure HCl gas resulting from the reduction process continues into the reactor 4, and passes over 99.9999% pure elemental gallium 5 which is held in its reservoir at a temperature of about 850° C. by the gallium furnace 9. The gallium combines with the HCl gas and is transported as gallium chloride to the mixing portion of the reactor near the gallium arsenide substrate held by the seed holder 10. The following equilibria prevail:

$$2HCl+2Ga \rightleftarrows 2GaCl+H_2$$
$$3GaCl \rightleftarrows 2Ga+GaCl_3$$

Arsenic is supplied to the system by bubbling highly pure hydrogen through a separate bubbler 7 of distilled $AsCl_3$. The $AsCl_3$ hydrogen stream combines with the gallium chloride-hydrogen stream in the mixing portion of the reactor 4 near the substrate. Elemental gallium and arsenic are deposited on the substrate in appropriate amounts forming stoichiometric deposits of gallium arsenide.

Any suitable design may be employed to accomplish the mixing of the reactant gas streams before they reach the substrate. A stream of highly pure hydrogen 12 is brought in at the front end of the reactor as a carrier to insure positive movement of the gases from the entrance to the exhaust.

The gallium arsenide substrate temperature is maintained between 650° C. and 700° C. by the substrate furnace 8. Very pure substrate material is used; on the order of $10^{14}$ to $10^{15}$ cm.$^{-3}$ excess donor concentration, when not deliberately doped.

It has been found that the rate of flow of HCl over the gallium in the gallium reservoir must be made very small compared to the rate of flow of the $AsCl_3$-$H_2$ stream. For example, a flow rate of about 150 cc./min. $AsCl_3$ and $H_2$ requires that the flow rate of HCl over the gallium be about 5 cc./min. Moreover, in such a case, changes in the HCl flow rate of 3 to 4 cc./min. cause deposition of GaAs to cease. For some reason or reasons not fully understood, there appears to be a critical flow rate of HCl over the gallium in the gallium reservoir. It may be that there is a critical Ga:As ratio which in turn would determine a critical rate of Ga transport into the system. Or it may be that the rate of flow of gallium chloride itself determines whether deposition or etching occurs. Whatever the correct explanation, it is certain that there is a critical rate of flow of HCl over the gallium in the gallium reservoir. This rate of flow must be determined empirically.

Every effort to eliminate impurities from the reactant vapors having been made, further purity can be obtained by depositing upon the surface of a seed or substrate cut so that the <100> plane is exposed. By changing the segregation coefficient of the impurities, the <100> orientation minimizes the incorporation of N-type impurities in the deposit. See Williams, Forrest, The Journal of the Electrochemical Society, vol. 111, pages 886 to 888 (1964). Since by far most impurities present are N-type, the <100> orientation admits less total impurities into the deposit than other growth directions. Since the (111) B orientation, by which is meant the <111> face terminating with arsenic atoms, admits the maximum amount of N-type impurities, accurately controlled orientation of the seed or substrate deposition surface off the <100> plane toward the (111) B plane prevents the formation of highly compensated or P-type material which would have restricted electron mobility.

In fact, exact regulation of the substrate surface orientation from 1° to 5° off the <100> plane toward the (111) B plane allows precise control of the carrier concentration in the epitaxial deposit within the low levels shown in FIGURE 2. Fine adjustment of the stoichiometric composition of the deposit is possible because of the purity of the reactants. As the orientation of the substrate surface is adjusted one or more degrees off the <100> plane toward the (111) B plane, the number of N-type carriers incorporated into the deposit is increased.

The method of the invention provides marked advantages in producing ultra high purity, high mobility epitaxial gallium arsenide deposits as is demonstrated by the table presented in FIGURE. 2. The low level of excess N-type carriers together with the high level of mobility shows that the material is extremely pure. Moreover, the consistent results over consecutive runs indicate the reliability of the technique.

What is claimed is:

1. The method of forming high purity epitaxial deposits of gallium arsenide, comprising the steps of:

(a) entraining distilled arsenic trichloride in a stream of highly pure hydrogen,
(b) reducing the stream of arsenic trichloride and hydrogen to elemental arsenic and highly pure hydrogen chloride gas,
(c) passing said hydrogen chloride gas over ultra pure elemental gallium held at a temperature of about 850° C. whereby the gallium combines with the hydrogen chloride gas and is transported as gallium chloride to the mixing portion of a reactor near a monocrystalline gallium arsenide substrate,
(d) entraining distilled arsenic trichloride in a second stream of highly pure hydrogen,
(e) combining the second arsenic trichloride-hydrogen stream with the gallium chloride-hydrogen stream in the reactor near the gallium arsenide substrate, and
(f) depositing elemental gallium and arsenic on the substrate in appropriate amounts, forming stoichiometric deposits of gallium arsenide.

2. The method according to claim 1 wherein the monocrystalline gallium arsenide seed surface is oriented 1° to 5° off the <100> plane toward the (111) B plane.

3. The method according to claim 1 wherein the rate of flow hydrogen chloride gas over elemental gallium is small compared to the rate of flow of the second arsenic trichloride-hydrogen stream.

4. In the method of producing epitaxial deposits of monocrystalline gallium arsenide on a gallium arsenide substrate by reacting gallium chloride with a vapor source of arsenic near a heated gallium arsenide substrate, the steps of:

(a) reducing highly pure $AsCl_3$ with hydrogen, thereby producing highly pure HCl,
(b) introducing said highly pure HCl into a reactor immediately following the production of said HCl,
(c) passing said HCl over ultra pure gallium within said reactor, whereby the gallium combines with the hydrogen chloride gas and is transported as gallium chloride to the mixing portion of a reactor near a monocrystalline gallium arsenide substrate, and
(d) combining a stream of $AsCl_3$ entrained in hydrogen with the gallium chloride-hydrogen stream near said gallium arsenide substrate.

5. In the method of claim 4, the step of exposing a major surface of said gallium arsenide substrate oriented from about 1° to about 5° off the <100> plane toward the (111) B plane to the process stream resulting from said combining of said stream of $AsCl_3$ entrained in hydrogen with the gallium chloride-hydrogen stream.

References Cited

UNITED STATES PATENTS

| | | | |
|---|---|---|---|
| 3,218,205 | 11/1965 | Ruehrwein. | |
| 3,224,911 | 12/1965 | Williams et al. | 148—175 |
| 3,310,245 | 3/1967 | Goldsmith | 117—106 |

ANDREW G. GOLIAN, Primary Examiner.

U.S. Cl. X.R.

23—204; 117—106